United States Patent [19]

Pemberton et al.

[11] 4,066,210
[45] Jan. 3, 1978

[54] CHIMNEY HEAT RECLAIMER

[76] Inventors: Alonza R. Pemberton, R.R. 1, Box 17; Daniel R. Pemberton, R.R. 1, Box 78, both of Fredericksburg, Va. 22401

[21] Appl. No.: 579,201

[22] Filed: May 20, 1975

[51] Int. Cl.² .............................................. F24D 5/04
[52] U.S. Cl. ................................... 237/53; 122/20 B; 165/DIG. 2
[58] Field of Search ................ 237/55, 54, 53, 12.3 B, 237/66; 126/110 R, 117; 122/DIG. 1, 20.2

[56] References Cited

U.S. PATENT DOCUMENTS

| 777,083 | 12/1904 | Davis | 122/20 B |
|---|---|---|---|
| 1,016,044 | 1/1912 | Stephenson | 122/250 R |
| 1,597,014 | 8/1926 | Campbell et al. | 237/66 |
| 2,004,993 | 6/1935 | Karsel et al. | 237/12.3 B |
| 2,108,691 | 2/1938 | Mustee | 165/163 X |
| 2,252,784 | 8/1941 | Powers | 126/99 |
| 2,521,462 | 9/1950 | Kinzelmann | 122/20 B X |
| 3,556,124 | 1/1971 | Walton | 137/564 X |
| 3,916,991 | 11/1975 | Trump | 122/20 B |

Primary Examiner—William E. Wayner
Attorney, Agent, or Firm—Revere B. Gurley

[57] ABSTRACT

A tubular coil for circulating liquid extends upwardly at least partially the length of a chimney to absorb heat from the hot combustion gases emitted by a fuel combustion chamber in a heating furnace. This coil is connected to a heat exchange device, such as a radiating unit to supply heated fluid, such as hot air in a hot air furnace. In the principal form of the invention, the radiating unit supplied by heated fluid from the coil is positioned in the air circulated by the hot air heating system.

7 Claims, 3 Drawing Figures

CHIMNEY HEAT RECLAIMER

This invention relates to an energy saving system in which heat lost through the chimney of a heating system may be recovered and utilized in the heating system of the building or for other purposes.

It has long been recognized that the normal heating system which depends on fuel combustion to supply heat to a circulating fluid, either air or water, loses much of its heat through the flue which carries off the products of combustion. Various attempts have been made to recover this heat, as by heat exchanger units in the flue to the chimney or by air circulating heat exchanger units in the chimney. Many of these units have encountered problems in sooting, corrosion, leaking of fumes of combustion and cost, resulting in limited acceptance for general use.

The invention in this case utilizes a tubular coil of liquid in the chimney to absorb heat from the hot gaseous products of combustion and circulates the liquid through a heat exchanger, such as a radiating unit, to pass the heat to the heating fluid for the area to be heated. In the principal form, the radiating unit is positioned in a hot air furnace so that the blower in the furnace draws the air from the cold air duct through the radiating unit and then directs it over the combustion chamber or fire box to the hot air heating duct. The chimney coil is in the form of a double coil, with an inner and outer coil arranged coaxially in the chimney, which is much more efficient than a single coil.

Figure 1:
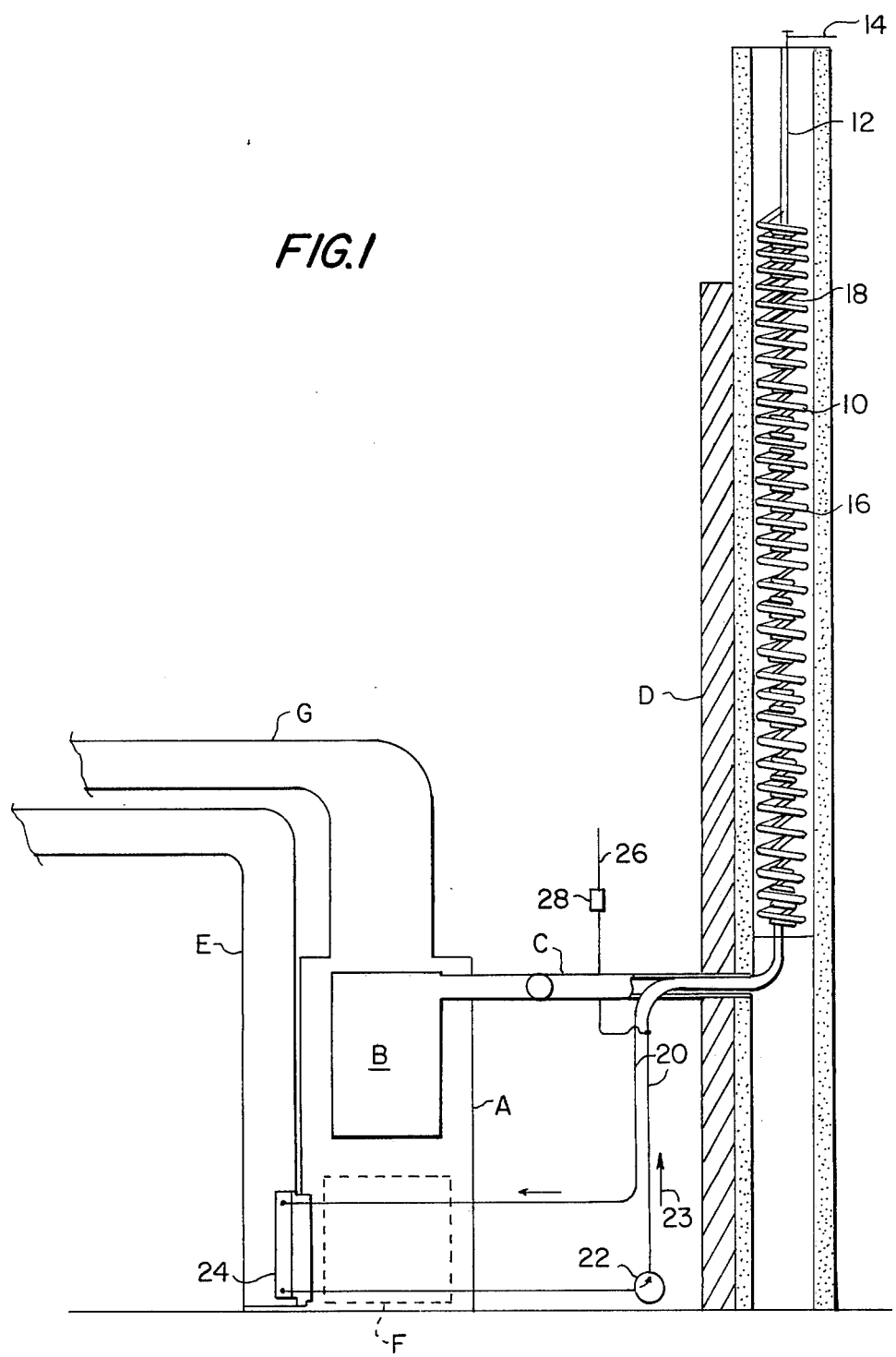
FIG. 1 is a schematic drawing of a hot air furnace and chimney with the invention installed therein.

In the installation of FIG. 1, the casing of the hot air furnace A encloses a fuel combustion chamber B connected by a smoke pipe C to chimney D. A cold air duct E leads to the air space surrounding the combustion chamber in the casing, and a blower F directs air from the cold air duct through the casing past the combustion chamber to a heating duct G.

In the chimney D a tubular coil 10 extends upwardly, with a pipe 12 leading to the top of the chimney and a support 14 resting on the chimney, to support the coil. The coil 10 is formed by an outer coil 16 and inner coil 18 connected together at the top where pipe 12 joins the coils to operate as an expansion chamber. A separate expansion chamber may be connected to the coil if necessary. Two pipes 20 connected to the lower ends of the coil 10 pass through smoke pipe C and into the air space in the casing of the furnace A, a pump 22 being connected in one of the two lines 20 to circulate liquid through the chimney coil, the arrow 23 indicating flow in these lines.

Located in the furnace A at the air inlet from the cold air duct E is a radiating unit 24 with liquid passages which are connected to the lines 20. This radiating unit is constructed for air to pass through between the passages. The blower F will draw air from the cold air duct E through the radiating unit 24 and pass the air over the combustion chamber B to heating duct G.

A line 26 is connected to one of the lines 20 to supply water to the circulating water circuit, a check pressure valve 28 opening to admit water when the pressure drops. Suitable controls may be connected to the pump to control operation of the electric motor to circulate the water as needed.

Figure 2:
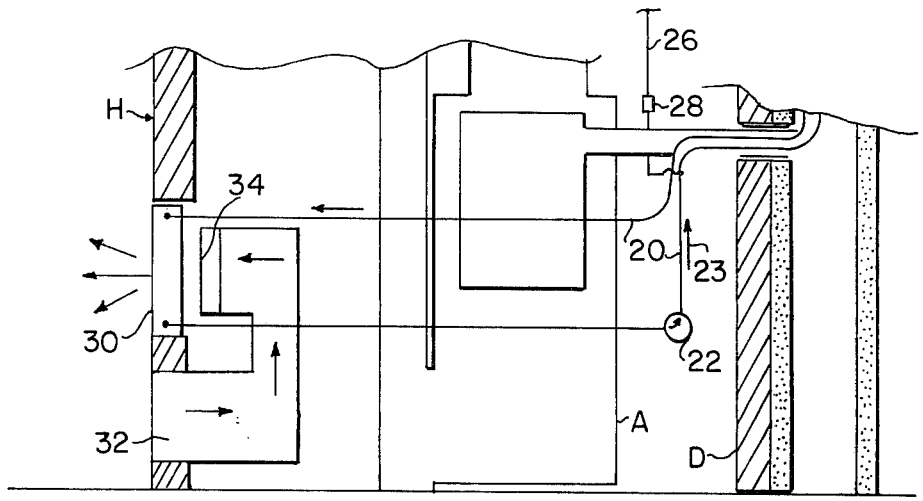
FIG. 2 is a modified form of the invention applied to heating a room.

In FIG. 2, the lines 20 from the coils are connected to a radiating unit 30 placed in a wall H of a room to be heated. A duct 32 opens from the room and leads air to the near side of the radiating unit, a blower and fan 34 drawing the air through the duct and directing it through the radiating unit.

Figure 3:
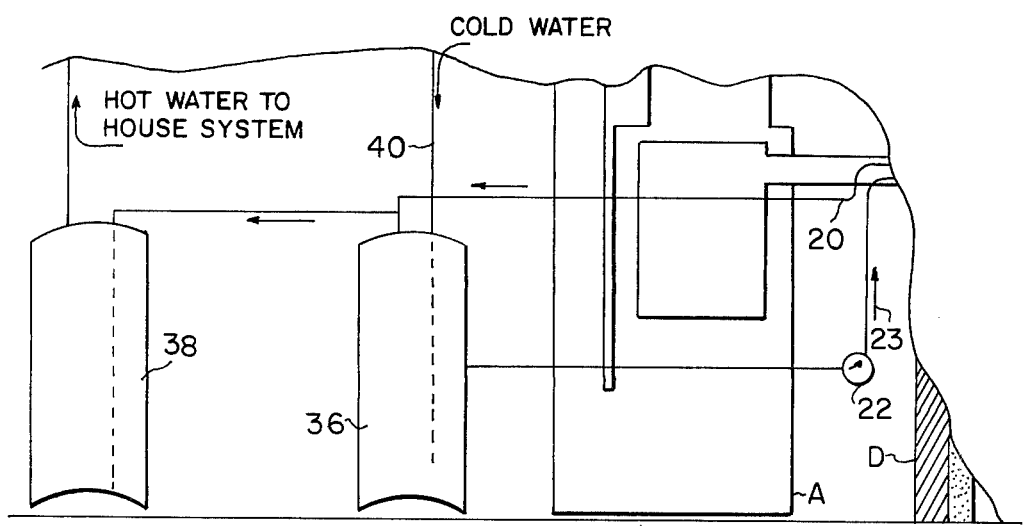
FIG. 3 is a second modified form, in which the liquid from the chimney coil is used to heat water, as in a hot water heating system.

FIG. 3 shows an installation for heating water, as in a water heating system. The lines 20 from the coils are connected to the upper part of a tank 36. The pipe in the top of the tank 36 is connected to a second tank 37 to supply heated water to the heating system. A pipe 40 feeds cold water from a water supply to the tank 36, while a hot water pipe 42 from tank 38 supplies hot water to the house system.

We claim:

1. In combination with a heating system which includes an enclosed air space, a fuel combustion chamber within said air space and cold and hot air ducts leading to and from said air space for cold return air and heated air, respectively, means for circulating air from said cold air duct through said air space and past said combustion chamber to said hot air duct, a chimney, and a smoke pipe connected to said combustion chamber and said chimney to carry off the hot gaseous products of combustion and provide draft for combustion of fuel in said chamber, means for utilizing heat from the flue gases in said chimney emitted from said combustion chamber comprising a tubular coil extending upwardly in said chimney, for liquid to absorb heat from the flue gases, a pipe connected to the top of said coil to form an expansion chamber and a support connected to the upper end of said pipe and supported on the top of said chimney, a radiating unit having passages for circulation of liquid and constructed for passing air through said unit to be heated by liquid in said passages, said unit being positioned so that said means for circulating air passes air from said cold duct through said unit, connecting lines from said coil to said passages in said radiating unit, and a pump in said lines to circulate liquid through said coil and through the passages in said radiating unit, so that the liquid heated in said coil heats the air from said cold duct passing through said radiating unit.

2. In combination with a heating system having a fuel combustion chamber, means for circulating heating fluid from the system to heat said fluid by fuel combustion in said chamber, a chimney and a smoke pipe connecting said combustion chamber to said chimney, means for utilizing heat from the flue gases in said chimney passing from said combustion chamber through said smoke pipe comprising a tubular coil extending vertically in said chimney and having inner and outer coils connected at the top and a pipe connected to the upper end of said coils to form an expansion chamber, said pipe having a support extending over the top of said chimney to support the coil on said chimney, a heat exchange unit through which said heating fluid flows, and liquid passages for said liquid from said tubular coil, lines from said coil in said chimney passing through said smoke pipe and connected to the liquid passages in said heat exchange unit and a motor driven pump in said lines for circulating liquid through said tubular coil and said liquid passages.

3. In a heating system as claimed in claim 2, in which a casing encloses said fuel combustion chamber, said heat exchange unit is located in said casing and said means for circulating heating fluid circulates said fluid through said heat exchange means.

4. In combination with a heating system having a fuel combustion chamber, fluid circulating means for circulating fluid from the system to heat said fluid by fuel combustion in said chamber and emit said heated fluid to said system, a chimney connected to said combustion chamber by a smoke pipe to carry off the heated products of combustion and provide draft for combustion in said chamber, a tubular coil for liquid extending upwardly above the smoke pipe in said chimney, a pipe connected to the top of said coil to form an expansion chamber and a support connected to the upper end of said pipe and supported on the top of said chimney, a heat exchange unit in the circulating fluid from said fluid circulating means and having liquid passage means in heat exchange relation to said circulating fluid to transfer heat from the liquid to said fluid, lines from said coil passing through said smoke pipe to said heat exchange unit to circulate liquid through said coil and said liquid passage means of said heat exchange unit, and a pump in said connecting lines to circulate said liquid through said coil and said liquid passage means, so that said heated liquid from said coil will heat said fluid in said heating system.

5. In combination with a heating system which includes a fuel combustion chamber, a chimney having a vertical flue and a smoke pipe connecting said combustion chamber to said chimney to carry off products of combustion from said combustion chamber and provide draft for combustion, means for utilizing heat from the flue gases in said chimney emitted from said combustion chamber comprising a tubular coil extending upwardly in said chimney, said coil having a vertical pipe connected at its upper end to form an expansion chamber and a bracket connected to said pipe and supported on said chimney, and a radiating unit having liquid passages and constructed to pass air through the radiating unit for heating a space adjacent said unit, connecting lines passing through said smoke pipe between said passages in said radiating unit and said coil to form a circuit for liquid to circulate through said passages and said coil, a pump in said connecting lines to circulate liquid through said circuit, and means to circulate air through said radiating unit into said space.

6. In the combination claimed in claim 5, said tubular coil being a double coil with an inner coil and outer coil extending coaxially in said chimney.

7. In the combination claimed in claim 5, a water connection to the line between said radiation unit and said coil, and a check valve in said water connection which will open to admit more water when the pressure in the line falls below an assigned value.

* * * * *